US009020127B2

(12) United States Patent
Ezell et al.

(10) Patent No.: US 9,020,127 B2
(45) Date of Patent: Apr. 28, 2015

(54) NUMBER NORMALIZATION AND DISPLAY (71) Applicant: Avaya Inc., Basking Ridge, NJ (US)

(72) Inventors: Joel M. Ezell, Broomfield, CO (US);
Kurt Haserodt, Westminster, CO (US);
William T. Walker, Evergreen, CO (US)

(73) Assignee: Avaya Inc., Basking Ridge, NJ (US)

( * ) Notice: Subject to any disclaimer, the term of this patent is extended or adjusted under 35 U.S.C. 154(b) by 241 days.

(21) Appl. No.: 13/630,819

(22) Filed: Sep. 28, 2012

(65) Prior Publication Data
US 2014/0093060 A1 Apr. 3, 2014

(51) Int. Cl.
*H04M 7/00* (2006.01)
*G06F 17/30* (2006.01)

(52) U.S. Cl.
CPC *G06F 17/30* (2013.01); *H04M 7/00* (2013.01)

(58) Field of Classification Search
USPC .......... 379/221.01, 221.12, 221.14, 219, 379/142.04, 142.06, 142.14, 355.06, 201.01
See application file for complete search history.

(56) References Cited

U.S. PATENT DOCUMENTS

| | | | | |
|---|---|---|---|---|
| 5,475,743 A * | 12/1995 | Nixon et al. | ............. | 379/355.07 |
| 5,887,058 A * | 3/1999 | Kammath et al. | ............. | 379/284 |
| 6,275,574 B1 * | 8/2001 | Oran | ............. | 379/201.01 |
| 6,826,732 B2 * | 11/2004 | Hunt et al. | ............. | 716/106 |
| 6,968,389 B1 * | 11/2005 | Menditto et al. | ............. | 709/233 |
| 7,146,158 B2 | 12/2006 | Belkin et al. | | |
| 7,305,479 B1 * | 12/2007 | Morris et al. | ............. | 709/229 |
| 7,330,463 B1 * | 2/2008 | Bradd et al. | ............. | 370/352 |
| 7,408,925 B1 * | 8/2008 | Boyle et al. | ............. | 370/352 |
| 7,609,687 B2 * | 10/2009 | Kobayashi et al. | ............. | 370/356 |
| 8,179,804 B2 | 5/2012 | Boyle et al. | | |
| 8,649,498 B1 * | 2/2014 | Rankin et al. | ............. | 379/221.14 |
| 8,654,966 B2 * | 2/2014 | Elharrar | ............. | 379/355.06 |
| 2002/0122547 A1 * | 9/2002 | Hinchey et al. | ............. | 379/221.01 |
| 2005/0097222 A1 * | 5/2005 | Jiang et al. | ............. | 709/245 |
| 2005/0273450 A1 | 12/2005 | McMillan et al. | | |
| 2008/0175370 A1 * | 7/2008 | Elharrar | ............. | 379/221.14 |
| 2011/0222680 A1 * | 9/2011 | Rawet | ............. | 379/216.01 |
| 2011/0255678 A1 | 10/2011 | Millett et al. | | |

FOREIGN PATENT DOCUMENTS

KR 2006-0088560 8/2006

OTHER PUBLICATIONS

Official Action with English Translation for Korea Patent Application No. 2013-0075834, dated Jun. 13, 2014 6 pages.

* cited by examiner

*Primary Examiner* — William Deane, Jr.
(74) *Attorney, Agent, or Firm* — Sheridan Ross P.C.

(57) ABSTRACT

Methods, devices, and systems are provided such that enterprise network administrators may create and display a dial plan management arrangement using enterprise canonical format and number normalization and friendly display tables. A solution is provided for creating and managing call routing simply and graphically using enterprise canonical format rather than through a legacy routing scheme using of a series of tables with no graphic depiction and multiple formats. By using a single format with a graphical representation when administering dial planning, implementation and management are significantly simpler and more efficient.

20 Claims, 6 Drawing Sheets

Number Normalization Table

Location: Westminster

| Pattern | Min | Max | Action |
|---------|-----|-----|--------|
| 8 | 5 | 5 | Insert 53 |
| 538 | 7 | 7 | None |
| 444 | 7 | 7 | None |
| 953 | 7 | 7 | None |
| x | 9 | 9 | None |

<u>Denver Metro NNT</u>

— 316a

Number Normalization Table

Location: Denver Metro

| Pattern | Min | Max | Action | Action |
|---------|-----|-----|--------|--------|
| 9720 | 11 | 11 | Insert 2DT | Delete 1, Insert +1 |
| 9303 | 11 | 11 | Insert 2DT | Delete 1, Insert +1 |
| x | 9 | 35 | | |

<u>North America NNT</u>

— 312

Number Normalization Table

Location: North America

| Pattern | Min | Max | Action | Action |
|---------|-----|-----|--------|--------|
| 91 | 12 | 12 | Insert 2DT | Delete 1, Insert +1 |
| 9011 | 9 | 35 | Insert 2DT | Delete 4, Insert + |
| + | 9 | 18 | | |

<u>Global NNT</u>

Number Normalization Table

Location: Westminster

| Pattern | Min | Max | Action | Action |
|---------|-----|-----|-----------|------|
| 8 | 5 | 5 | Insert 53 | None |
| 538 | 7 | 7 | None | None |
| 444 | 7 | 7 | None | None |
| 953 | 9 | 9 | None | None |
| x | | | Denver Metro NNT | |

Friendly Display Table

Location: Westminster

| Pattern | Min | Max | Action |
|---------|-----|-----|--------|
| 538 | 7 | 7 | Delete 2 |
| 444 | 7 | 7 | None |
| 953 | 9 | 32 | None |
| x | | | Denver Metro FDT |

NUMBER NORMALIZATION AND DISPLAY

FIELD

The present disclosure is directed generally to enterprise networks and specifically to creating and displaying a dial plan management system using enterprise canonical format and number normalization and friendly display tables.

BACKGROUND

An enterprise network's effectiveness is directly impacted by whether or not a dial plan meets or fails to meet a company's requirements. It is the responsibility of an enterprise network administrator to ensure that the network has been set up to handle telephone calls in an efficient way. A telephone numbering plan is a set of rules used to assign telephone numbers and features to users and to route calls within telephone networks. The dial plan is a specific set of country codes, area codes, access codes, or combinations of dialed digits that sets the number and patterns of digits for all calls and administered features in the network. The typical dial plan models include open and closed dial plans, where an open dial plan allows variability of length of dialed digits and closed dial plan has a fixed total length of dialed digits.

Administrators typically build dial patterns/plans that are location-specific. The dial patterns often include "short codes" for dialing people that are collocated, and the short codes may not be unique across the enterprise network in different locations. Each location typically has local dialing rules such as "9" to get an outside line, "1" for long distance, and "011" for international in the United States.

Historically, dial plans have included some or all of the following routing tables/strategies in addition to short codes and local dialing rules: Automated Alternate Routing (AAR—private), Automatic Route Selection (ARS—public), Uniform Dial Plan (UDP—other, not AAR or ARS), and Feature Access Codes (FAC). There is no uniform graphic depiction of routing, and the tables listed above are commonly in text data entry format only.

With the complexity of today's private branch exchanges (PBXs), diversity of locations and distributed models, and the use of multiple protocols in hybrid networks (e.g., VoIP, SIP, Virtual), establishing and managing an effective dial plan has become increasingly challenging. A question arises as to how the dial plan in an enterprise network can be easily and effectively managed and displayed.

SUMMARY

It is with respect to the issues above and other problems that the embodiments presented herein were contemplated. In particular, embodiments of the present disclosure propose the ability to remove legacy routing tables and strategies and the utilization of a new paradigm for enterprise network routing. This proposal suggests application of the canonical model to dial plans to provide at least one number per user that is unique across the enterprise, and a tree structure to graphically depict the dial pattern for an administrator. Instead of legacy routing, a hierarchy of generic Number Normalization Tables (NNT) and Friendly Display Tables (FDT) would be provisioned. Three of the major issues faced by administrators include overlapping extensions, overlapping dial access codes, and feature transparency which would be solved with the new model. Other issues would be addressed as well. Core applications would no longer need to be aware of location-specific dialing while working in enterprise canonical numbers. A tree structure would be associated with locations or groups, rather than an endpoint or server as in the legacy routing model. Groups and individuals can be assigned to servers based on location.

The number normalization tables would change the legacy routing model. Number normalization would eliminate AAR, ARS, UDP, and FAC tables. Enterprise canonical numbers and number normalization rule attributes could be assigned for each end user in a location-independent, enterprise network unique format. Guidelines would include instructions on provisioning to avoid conflicts between short-dialing and number normalization. The NNT would perform all of the dial plan and feature capabilities traditionally handled by a legacy routing plan, and the FDT would convert any number-ing format into an easily identifiable number for the telephone display. Additionally, the NNT and FDT strategy could be graphically depicted in a series of linked pages for ease of use and efficiency for administrators.

The phrases "dial plan" and "dial pattern" as used herein refer to a numbering scheme used to allocate telephone numbers to subscribers and route calls in a telephony or enterprise network.

The phrase "enterprise canonical" as used herein means unique across an enterprise network.

The phrase "number normalization" as used herein refers to the process of translating number strings presented in various formats into a single standard format for routing and display.

The phrase "short-dialing" as used herein means special telephone numbers, significantly shorter than full telephone numbers, which can be used within an enterprise network to call internal parties without dialing the full telephone number.

The phrase "uniform resource identifier" or URI as used herein refers to a string of characters used for resource naming and identification.

The phrase "visual depiction" or "graphic depiction" as used herein is a picture which allows the audience to form a clear mental image of an illustrated concept or provides a representation of an actual screen, product, or feature.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored. When the computer-readable media is configured as a database, it is to be understood that the database may be any type of database, such as relational, hierarchical, object-oriented, and/or the like.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the disclosure. Rather, the ensuing description will provide those skilled in the art with an enabling description for implementing the embodiments. Various changes may be made in the function and arrangement of elements without departing from the spirit and scope of the disclosure as set forth in the appended claims.

Figure 1:
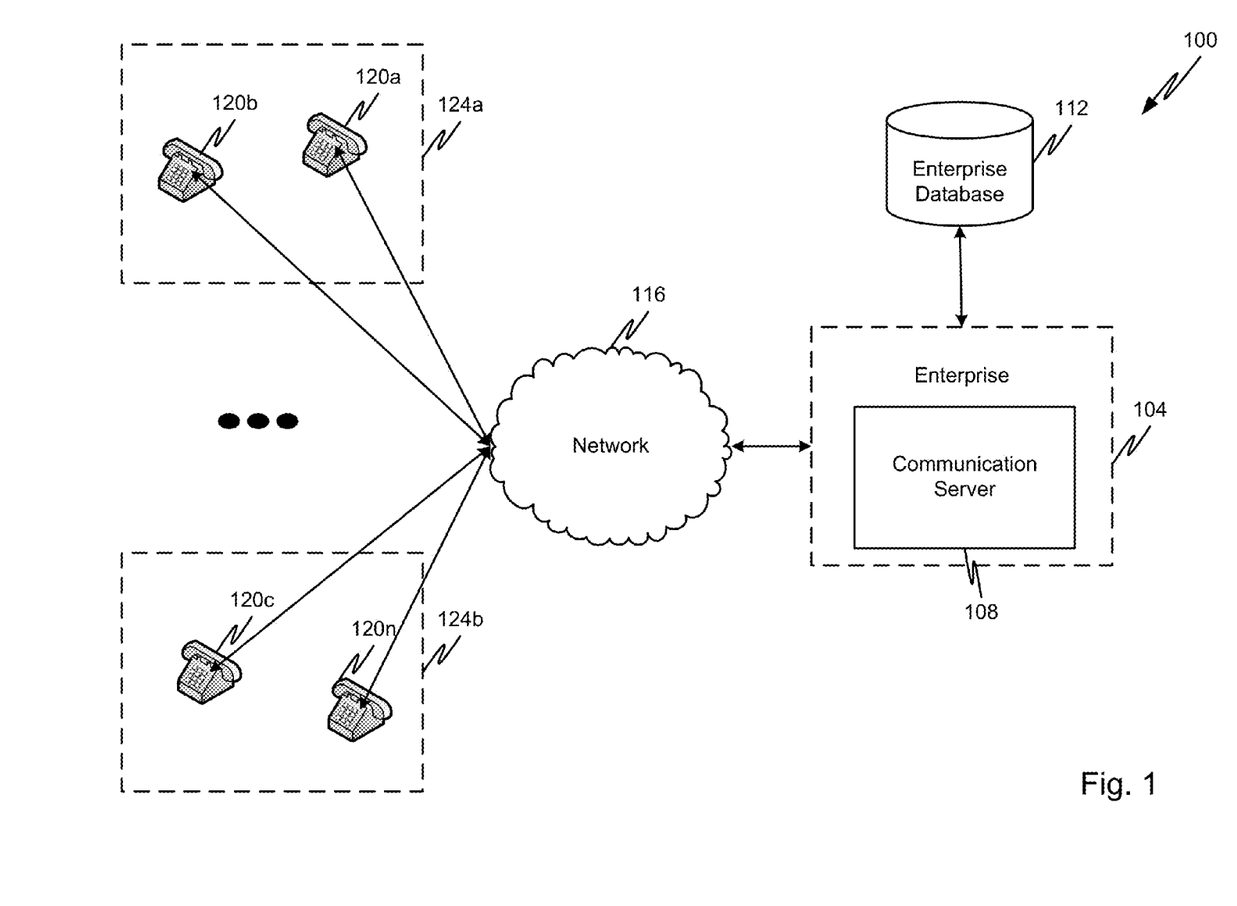
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprise one or more communication networks 116 that facilitate communications between an enterprise network communication server 108 and one or more employees' user devices 120*a*-*n* and local area networks or distributed locations 104,124*a*-*b*. The communication system 100 may include a greater or lesser number of distributed sites, secondary locations, or connections to other companies than shown, as illustrated by the ellipses.

The communication network 116 may be packet-switched and/or circuit-switched. An illustrative communication network 116 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a SIP network, a Voice over IP (VoIP) network, or combinations thereof. In one configuration, the communication network 116 is a public network supporting the TCP/IP suite of protocols. Communications supported by the communication network 116 include real-time, near-real-time, and non-real-time communications. For instance, the communication network 116 may support voice, video, text, web conferencing, or any combination of media. Moreover, the communication network 116 may comprise a number of different communication media such as coaxial cable, copper cable/wire, fiber-optic cable, antennas for transmitting/receiving wireless messages, and combinations thereof. In addition, it can be appreciated that the communication network 116 need not be limited to any one network type, and instead may be comprised of a number of different networks and/or network types.

An enterprise network 104 may provide a location where employees' user devices 120*a*-*n* can access and use enterprise network services. Examples of services that may be offered by the enterprise network 104 include communication services, media services, data storage services, processing services, application services, combinations thereof, and any other automated or computer-implemented services, applications, or telephony features. In some embodiments, the enterprise network 104 may provide access to its services via one or more web pages served by a web server or group of web servers and may be administered or controlled by an administrator. The enterprise network 104 may provide employees 120*a*-*n* with a dial plan that offers specific rules and parameters for routing calls within and outside of the enterprise network 104.

As will be discussed in further detail herein, the enterprise network 104 may comprise the functionality to provide any number of telephony services and applications for employees' user devices 120*a*-*n*, and store parameters including user preferences in an enterprise network database 112. This provides a specific set of information to effectively deliver telephony and data services from the enterprise network 104 to the employees' user devices 120*a*-*n*.

It should be appreciated that the enterprise network 104 may be distributed. Although embodiments of the present disclosure will refer to a single enterprise network 104 with multiple locations and employees, it should be appreciated that the embodiments claimed herein are not so limited. For instance, multiple enterprise networks 104 may be connected by multiple different servers and networks. Employees may be associated with one or more instances of the enterprise network 104, and may be connected through the communication network 116 to other communication networks, enterprise networks, and companies.

The communication system 100 may be a distributed system and, in some embodiments, comprises a communication network 116 connecting one or more locations 124 to an enterprise network 104 having access to an enterprise network database 112. In some embodiments, the enterprise network 104 may administer a communication server 108 in which a dial plan is created and distributed to handle call flow and application delivery to and from employees' user devices 120*a-n*.

The employees' user devices 120*a-n* may correspond to employee, customer, or other communication devices. In accordance with at least some embodiments of the present disclosure, an employee may utilize his or her communication device 120 to initiate a call, which may be initiated inside or outside the enterprise network 104. Exemplary options include, but are not limited to, a call directed from one employee outside of the United States calling into a location within the United States, an employee calling another employee in the same geographic location, a customer calling into a specific geographic location from outside of the enterprise network, and the like. The call may utilize one of a number of protocols, transmitted over the communication network 116. For example, the call may be transmitted as a telephone call over VoIP, a telephone call over SIP, or analog or digital calls over wired systems, and hybrid combinations thereof.

In accordance with at least some embodiments of the present disclosure, the communication devices 120 may comprise any type of known communication equipment or collection of communication equipment. Examples of a suitable communication device 120 include, but are not limited to, a personal computer, laptop, Personal Digital Assistant (PDA), cellular phone, smart phone, telephone, or combinations thereof. In general each communication device 120 may be adapted to support video, audio, text, and/or data communications with other communication devices 120 as well as the processing resources of the communication server 108. The type of medium used by the communication device 120 to communicate with other communication devices 120 or processing resources of the communication server 108 may depend upon the communication applications and features available on the communication device 120 and on the communication server 108. More specifically, the communication server 108 may comprise one or more dial plans, managed by one or more administrators.

Figure 2:
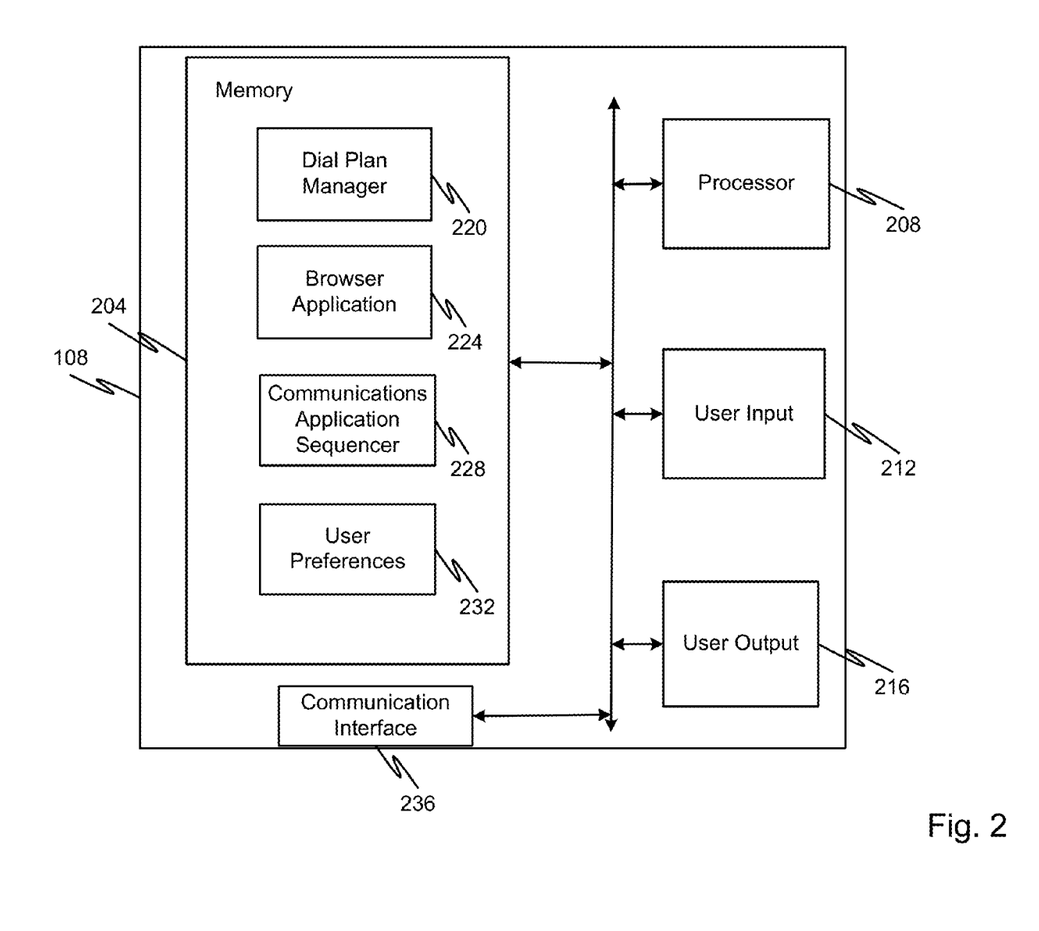
FIG. 2 is a block diagram depicting components of an enterprise network server that are utilized in accordance with embodiments of the present disclosure.

FIG. 2 depicts an illustrative embodiment of an enterprise network communication server 108 in accordance with at least some embodiments of the present disclosure. In some embodiments, the communication server 108 can include a processor 208 capable of executing program instructions. The processor 208 can include any general purpose programmable processor or controller for executing application programming. Alternatively, the processor 208 may comprise an application specific integrated circuit (ASIC). The processor 208 generally functions to run programming code implementing various functions performed by the associated server or device. For example, the processor 208 of the communication server 108 can implement enterprise network routing for employee communication devices 120 through execution of a dial plan through the communication server's modules.

The communication server 108 additionally includes memory 204. The memory 204 can be used in connection with the execution of programming by the processor 208, and for the temporary or long term storage of data and/or program instructions. For example, the communication server 108 memory 204 can include software implementing the dial plan manager module 220, a browser application module 224, a communications application sequencer module 228, and a user preferences module 232 that can operate together to present a dial plan strategy for communication devices 120 participating in communications inside and outside of the enterprise network 104. The memory 204 of a communication server 108 or communication device 120 can include solid state memory that is resident, removable and/or remote in nature, such as DRAM and SDRAM. Moreover, the memory 204 can include a plurality of discrete components of different types and/or a plurality of logical partitions. In accordance with still other embodiments, the memory 204 comprises a non-transitory computer readable storage medium. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read.

The communication server 108 can also include or be connectable to user input devices 212 and user output devices 216. Such devices 212, 216 can be used in connection with the provisioning and operation of the communication server 108, and/or to allow users to access and control features or applications resident on the communication server 108. Examples of user input devices 212 include a keyboard, a numeric keypad, a touch screen, a microphone, scanner, and pointing device combined with a screen or other position encoder. Examples of user output devices 216 include a display, a touch screen display, a speaker, and a printer. The communication server 108 also generally includes a communication interface 236 to interconnect the associated server 108 to a communication network 116.

The communication server 108, in some embodiments, contains modules within the memory 204 for dial plan administration and execution for one or more enterprise network locations 104, 124 for incoming and outgoing telephone calls. The modules may run in concert or the modules may execute functions as discrete modules. The communication server 108 may include one or more of, but is not limited to, a dial plan manager module 220, a browser application module 224, a communications application sequencer module 228, and a user preferences module 232.

The dial plan manager module 220 may be configured to receive input from a human administrator. The dial plan manager module 220 can allow the administrator to create and store all aspects of the dial plan. The administrator may create one or more number normalization and friendly display tables using the dial plan manager module 220 which could be associated with functional or divisional groups, locations, or other related sets of employees based on input from the administrator. The dial plan manager module 220 would be operable to create number normalization rule attributes which could include matching criteria, matching pattern, minimum length, and maximum length. Actions could include digit conversion, deletion of digits, insertion of digits ("+" or a number), invocation of next table in the hierarchy, accessing table links with or without a prefix match, providing secondary dial tone, and no-match pass-through.

The dial plan manager module 220 may be configured to receive dial plan instructions from the administrator via the browser application module 224 which would be operable to create and display a user interface (UI) through which an administrator could create and manage a dial plan strategy. The browser application module 224 would be operable to manage input by an administrator to the dial plan manager module 220. The browser application module 224 would also display output from the dial planning and information from the communication server 108, which could include, but is not limited to any type of graphic depictions of locations or groups, user information and provisioning, authorization, number normalization tables, friendly display tables, number normalization rule attributes for specific types of telephone calls, enterprise canonical parameters, location information, trunking information, adjunct server information, error logs, alarm handling, ability to upgrade, testing, and licensing in addition to any other standard or unique enterprise network requirements.

The communications application sequencer module 228 may be configured to receive information via the browser application module 224 UI. One function of the communications application sequencer module 228 might be to run applications in a certain order. The administrator may access the browser application module 224 UI to set parameters for logic needed to sequence applications that might be important for a user or a group of users. When the user makes an outbound call from the enterprise network, the communications application sequencer module 228 may call a set of predetermined rules to sequence applications for the user. Any applications that have been configured by the administrator may be invoked or engaged in a specific order. The application sequencing may continue until all required applications in the sequence have been applied to the call. For example, the administrator may have set parameters for the user to engage call recording, a database lookup, and a plug-in for all of the user's outbound calls. The applications run in that order, so that when the call connects, the user has access to the functionality necessary for that call.

The predetermined rules can be entered by the administrator via the browser application module 224 UI and stored in the user preferences module 232. User preferences are the settings that may control a user's account, control the direction of calls made by the user, and signal which applications might be needed by the user. User preferences might include data such as language preference, short dialing options, message delivery, call display, etc.

The combination of the dial plan manager module 220 and the browser application module 224 allow the administrator to create and manage the dial plan for the enterprise network 104 for users and groups of users. The communications application sequencer module 228 and the user preferences module 232 allow calls to be customized for users and groups of users. In addition to creating number normalization tables, the administrator may be able to manage the dial plan using graphic depictions which will be discussed in detail in FIGS. 3*a-c*.

Figure 3A:
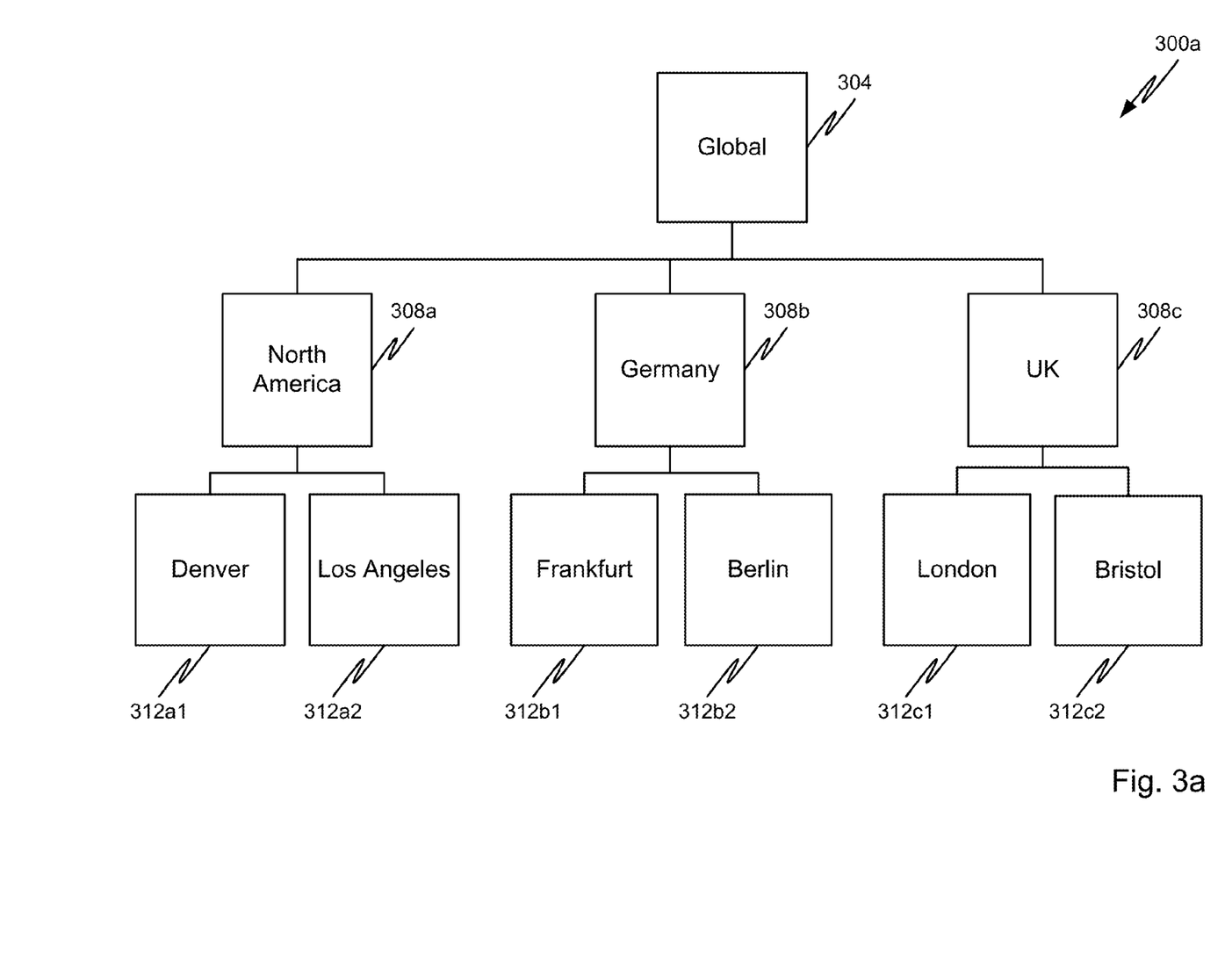
FIG. 3*a* depicts a dial plan user interface in accordance with embodiments of the present disclosure.

FIG. 3*a* illustrates a graphic depiction of a dial plan 300*a* which may be generated by the communication server 108 within the enterprise network 104 and displayed by the browser application module 224. The graphic depiction of a dial plan 300*a* includes a high level representation of tables in a tree model with leaf nodes that can be associated with groups of users in particular locations. Generally, the graphic depiction includes three tiers of locations 304, 308, 312 that represent users or groups of users in locations that have been matched to dial plan parameters set by the administrator in the dial plan manager module 220.

A tree is a widely-used data structure that simulates a hierarchical tree structure with a set of linked nodes. A node is a structure which may contain a value, a condition, or represent a separate data structure. Each node in a tree has zero or more child nodes, which are below it in the tree. A node that has a child is called the child's parent node, and a node may have one or more parents. The topmost node in a tree is called the root node. Being the highest node, the root node has no parent. All other nodes can be reached from the root node. Nodes at the bottom-most level of the tree are called leaf nodes. Since they are at the bottom-most level, they do not have any children.

Groups may be location-based or grouped in another way (e.g., organization, business function), and groups may be assigned to any node in the hierarchy (e.g. could assign North America table to group). Each node can reference 1 to N more general tables (with optional prefix match). Number normalization analysis would begin with an assigned node and would then proceed up the tree. If an exact match is found, the first match found would be executed. If no exact match is found, the longest match is selected. For example, a user in Frankfurt is represented by the node 312*b*1. If the user in Frankfurt makes an outbound call to a colleague in the London node 312*c*1, the call proceeds through the tree structure and underlying number normalization tables from Frankfurt node 312*b*1 to the Germany node 308*b* to the United Kingdom node 308*c* to the London node 312*c*1. The telephone number for the Frankfurt node 312*b*1 user is in enterprise canonical format and is unique across all enterprise network locations 104, 124. The telephone number for the London node 312*c*1 user is also in enterprise canonical format and is unique across all enterprise network locations 104, 124. Additionally, each site may have different private numbering prefixes. For example, Denver user Alice has private number 333-1234 and direct inward dialing number (DID)+1-303-280-1234. LA user Bob has private number 444-5678 and DID number +1-310-698-5678. With a quick look at this graphical depiction of locations and tables, the administrator is immediately able to see the intended normalization of the call regardless of rules, parameters, or number format.

Figure 3B:
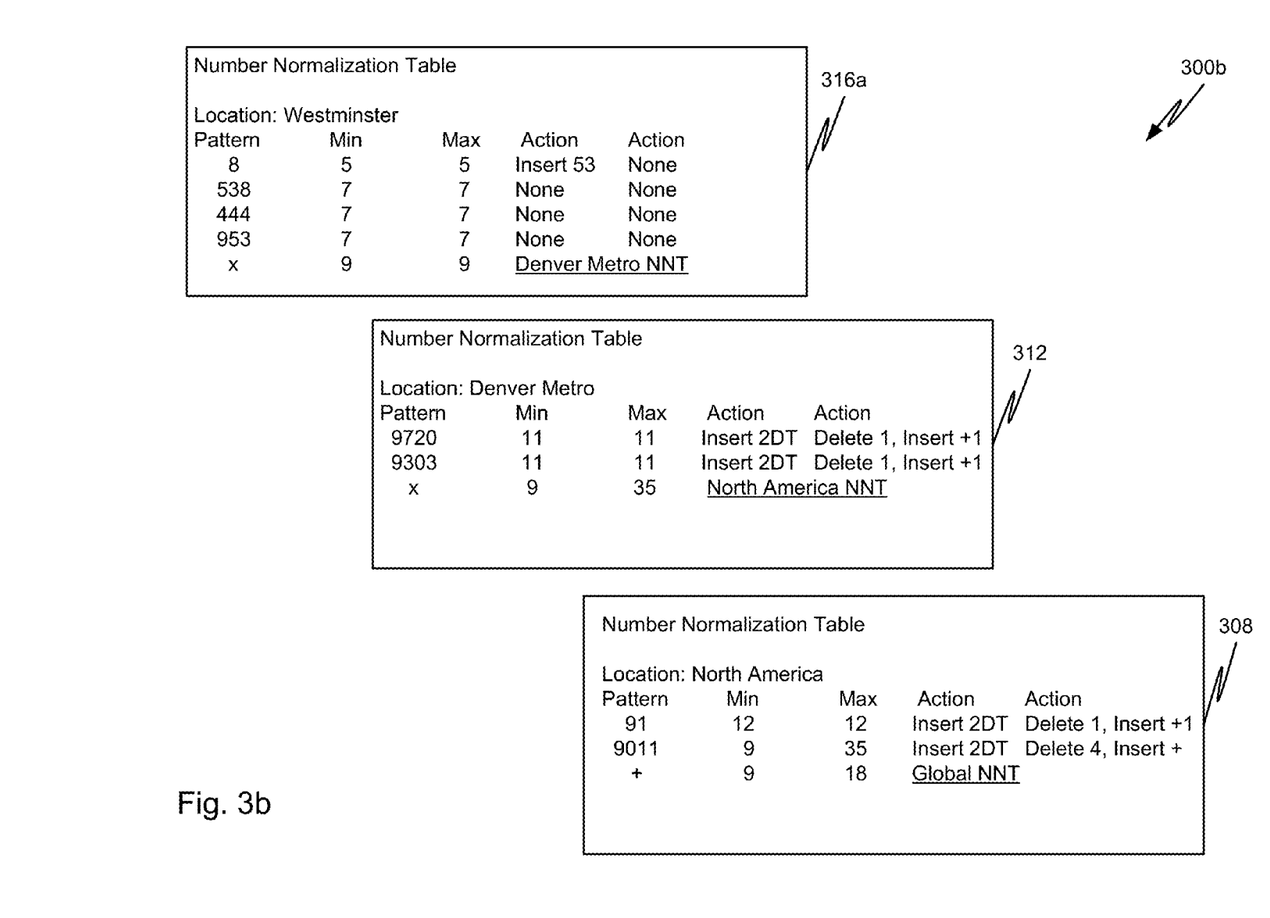
FIG. 3*b* depicts a dial plan user interface in accordance with embodiments of the present disclosure.

FIG. 3*b* illustrates a graphic depiction of a dial plan 300*b* which may be generated by the communication server 108 within the enterprise network 104 and displayed by the browser application module 224. The graphic depiction of a dial plan 300*b* includes number normalization tables (NNT) 308, 312, 316*a*. Some applications require request uniform resource identifiers (URIs) to be in enterprise canonical (EC) format. EC numbers are core-routable and uniquely represent a single user in any location or site throughout the enterprise network. Number normalization tables 308, 312, 316*a* set the rules for each user based on a set of predefined pattern matching and actions, include matching criteria, matching pattern, minimum length, and maximum length. Actions could include digit conversion, deletion of digits, insertion of digits ("+" or a number), invocation of next table in the hierarchy, accessing table links with or without a prefix match, providing secondary dial tone, and no-match pass-through as previously mentioned. Each level of normalization table 308, 312, 316*a* will contain a link to the parent node above it. For example, the Westminster Number Normalization Table 316 has a link to the parent node, Denver Metro NNT. The Denver Metro Number Normalization Table 312 has a link to the parent node, North America NNT. The North America Number Normalization has a link to the parent node, Global NNT.

A pattern matching example might be where Denver user Sally dials Denver user Mike at 51402. The digit string 51402 is run through the number normalization table at the Westminster level 316. The 5 digit number is converted from 81402 to 538-1402, where the 7-digit number 538-1402 is EC. If Mike made a telephone call to Tim who works down the street, the dialed number would be 93037642203, and the number normalization table at the Denver Metro level 312 would convert the number to +13037642203 and instruct the endpoint to insert secondary dial tone. Each of the number normalization tables would have a similar structure. An administrator might need to see tables at different levels, see an overall pictorial view, and be able to copy and create tables as needed.

In an additional embodiment, the administrator might define a battery of dial strings and the desired results for a given leaf node. A text box would allow entry of a dialed string and give a (normalized) result. This could allow the administrator to run tests using the number normalization tables either manually or with the push of a single button (an automated test).

In an additional embodiment, alpha-numeric dialing could be supported. For example, "acrazyguy@company.com" would be recognized and able to pass through NNTs.

Digit manipulation would be similar to what exists today, but the existing use of legacy routing tables and strategies would be replaced with enterprise canonical format, number normalization, the graphic depiction of the tree nodes and leaves, and the reversal of the digits with friendly display tables.

Figure 3C:
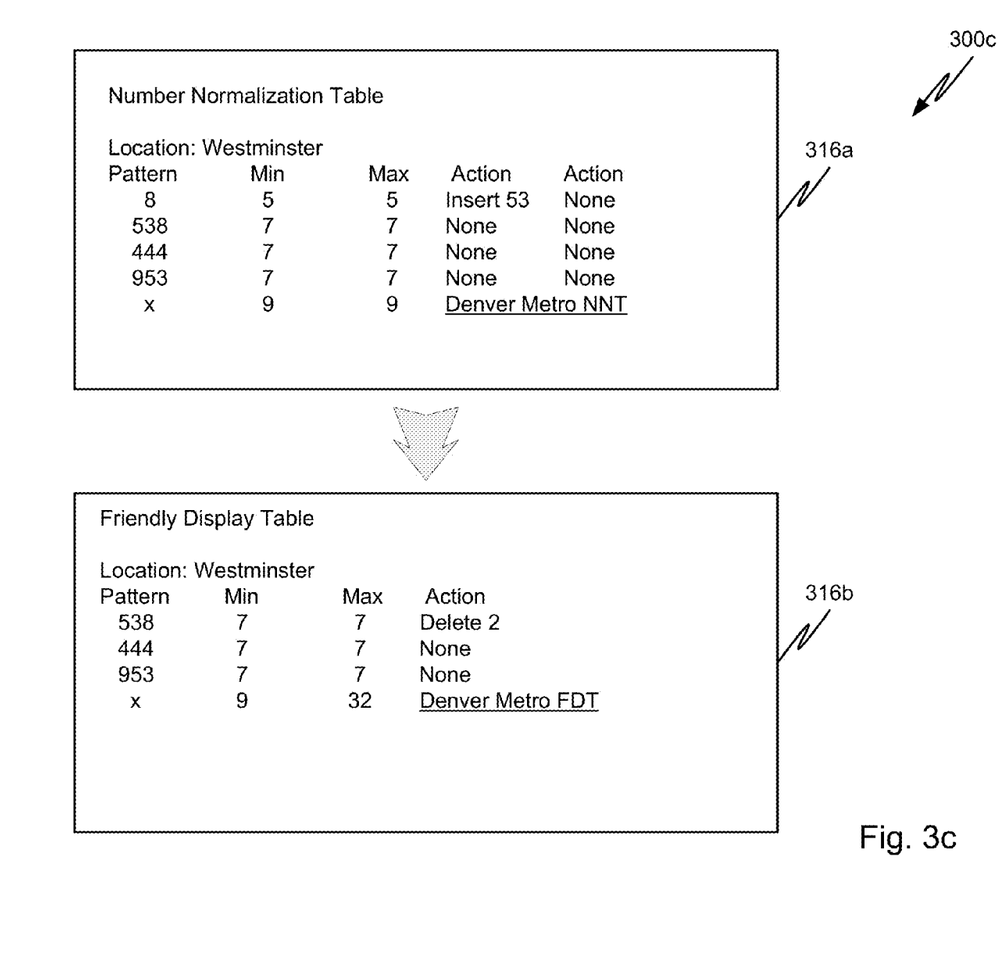
FIG. 3*c* depicts a dial plan user interface in accordance with embodiments of the present disclosure.

FIG. 3c illustrates a graphic depiction of a dial plan 300c which may be generated by the communication server 108 within the enterprise network 104 and displayed by the browser application module 224. The graphic depiction of a dial plan 300c includes a number normalization table 316a and a friendly display table 316b. A friendly display table 316b may essentially be a reversal of the number normalization done in table 316a. For example, in the number normalization table for Westminster 316a, if a user Jen dials 83802, the NNT 316a may insert 53, changing the string to 538-3802. In the friendly display table for Westminster 316b, if a user Sarah dials 538-0244, the FDT 316b may delete two digits, changing the string to 80244. The FDT 316b is designed to change the digit string to display the calling party's telephone number in short form as well as the called party's number in short form. This form, once run through the NNT 316a or the FDT 316b may be presented in the same format to the calling and called parties for all calls. As described above, in a manner similar to the NNT 316a, the FDT 316b may contain patterns, actions, and a link to the parent node.

Figure 4:
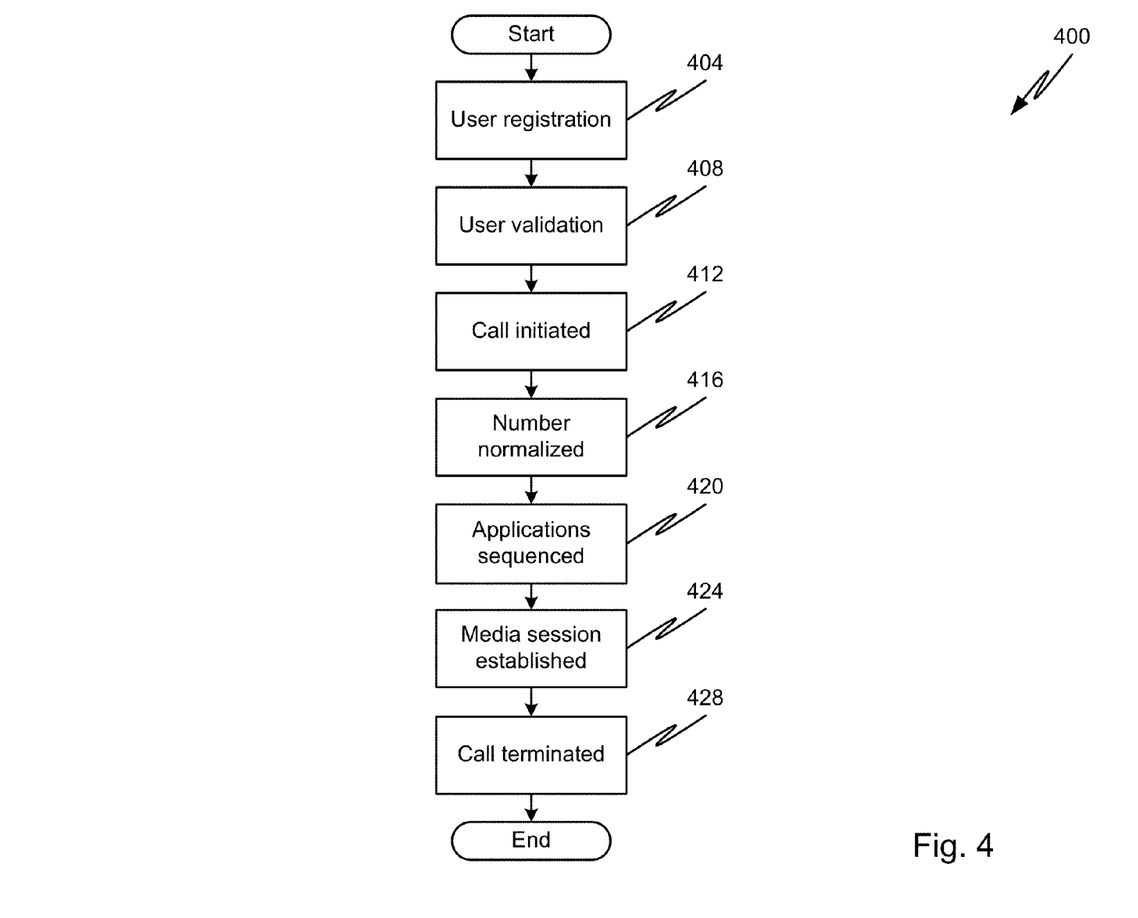
FIG. 4 is a flowchart depicting aspects of a method of number normalization in a call sequence in accordance with embodiments of the present disclosure.

A method 400 of number normalization in a call sequence is shown in FIG. 4. The method depicted and described herein will refer to steps taken by a communication server 108 to route telephone calls and administer features based on a normalization model. Generally, the method 400 begins with a start operation and ends with an end operation. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a non-transitory computer readable medium. Hereinafter, the method 400 shall be explained with reference to the systems, components, modules, software, data structures, etc. described in conjunction with FIGS. 1-3c.

In typical circumstances, a user in an enterprise network 104 will come into an office and may log into a telephone, in step 404. The user may enter credentials which generally include user identification and a password which have previously been set up by an administrator through the browser application module 224. The user credentials can be validated in step 408. In step 412, the user may pick up the telephone to make a call. The communications application sequencer module 228 in the communication server 108 will execute any existing logic, sequencing any applications requested for the user for that user's calls. Based on the dialed string, the telephone number may be run through the number normalization tables 304, 308, 312, 316, in step 416. Digits may be inserted or deleted, actions may be taken like inserting secondary dial tone, or if there are no matches, the number may be passed through. If the number is a known match within the enterprise network 104, the telephone number may also be run through the friendly display tables 316b, where the telephone number may have digits inserted or deleted, and actions may be taken like inserting secondary dial tone so that the calling party number may be displayed in a "friendly" format. If the number is not a match in any of the tables, the number may have no conversion.

Once the user is logged on and validated, a call has been initiated, and numbers have been normalized, applications may be sequenced, in step 420. Logic can be invoked which adds applications into a media session prior to establishing the media session. In step 424, the media session may be established where media may be transmitted between the user and a called party. For example, for a SIP call, an INVITE is sent with media capabilities, and can be answered with a 200 OK with media capabilities. A call takes place as the calling and called party are connected by means of, for example, an RTP two-way audio stream. When the user is done, he or she may terminate the call, in step 428. For example, for a SIP call, when there is a disconnect, a BYE is sent and each party is released. The process can end.

A number normalization paradigm that simultaneously simplifies dial planning and provides a graphic display for administrators is possible. The number normalization paradigm as disclosed herein can be applied to any enterprise network, from a small, single location to a global enterprise network. It should be appreciated that while embodiments of the present disclosure have been described in connection with enterprise network architecture, embodiments of the present disclosure are not so limited. In particular, those skilled in the enterprise network arts will appreciate that some or all of the concepts described herein may be utilized in a contact center, traditional telephony, mixed technology architecture, or multi-company model.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, call flows, and techniques may be shown without unnecessary detail in order to avoid obscuring the embodiments.

Also, it is noted that the embodiments were described as a process which is depicted as a flowchart, a flow diagram, a data flow diagram, a structure diagram, user interface, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling or main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The foregoing discussion of the disclosure has been presented for purposes of illustration and description. Further, the description is not intended to limit the disclosure to the form disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosure and to enable others skilled in the art to utilize the disclosure in such or in other embodiments and with various modifications required by the particular application or use of the disclosure. It is intended that the appended claims be construed to include alternative embodiments to the extent permitted by the prior art.

What is claimed is:

1. A method, comprising:
    maintaining a dial plan on a communication server in an enterprise network, the dial plan having a hierarchical structure where nodes in the dial plan comprise members which meet a common set of dial plan rules, wherein the hierarchical structure of nodes in the dial plan comprises a hierarchy of location levels;
    using the dial plan during call processing to normalize numbers dialed by users of the enterprise network, wherein normalizing the numbers dialed by the users is based on progressing from a node in the dial plan at a location level of a caller toward a root node; and
    using the normalized numbers to complete calls.

2. The method of claim 1, wherein the dialed numbers are normalized by the dial plan irrespective of a location from which the user dials the number.

3. The method of claim 1, further comprising:
    assigning a plurality of patterns for call flow in an enterprise canonical format;
    linking, by the communication server, the hierarchical structure of nodes based on the plurality of patterns; and
    displaying, based on the dial plan, a plurality of linked tables representing the dial plan.

4. The method of claim 1, wherein members of a first node in the hierarchical structure comprise at least one of a common location, organization, and business function.

5. The method of claim 1, wherein a first rule in the dial plan specifies a first pattern in a plurality of patterns based on a first rule set in the enterprise network.

6. The method of claim 5, wherein a second rule in the dial plan specifies a second pattern in the plurality of patterns based on a second rule set in the enterprise network.

7. The method of claim 6, wherein the first pattern is executed prior to execution of the second pattern.

8. The method of claim 1, wherein the progression from the node in the dial plan at the location level of the caller toward the root node is based a non-match of a dial pattern for a dial plan rule for a current node in the progression.

9. The method of claim 1, further comprising sending instructions to an endpoint to insert a secondary dial tone.

10. An enterprise network, comprising:
    a communication server configured to maintain a dial plan having a hierarchical structure where nodes in the dial plan comprise members which meet a common set of dial plan rules, wherein the hierarchical structure of nodes in the dial plan comprises a hierarchy of location levels and use the dial plan during call processing to normalize numbers dialed by users of the enterprise network, wherein normalizing the numbers dialed by the users is based on progressing from a node in the dial plan at a location level of a caller toward a root node.

11. The enterprise network of claim 10, wherein members of a first node in the hierarchical structure comprise at least one of a common location, organization, and business function.

12. The enterprise network of claim 10, wherein a first rule in the dial plan specifies a first pattern in a plurality of patterns based on a first rule set in the enterprise network.

13. The enterprise network of claim 11, wherein the communication server causes a display to be rendered of a graphic representation in an administrative user interface of the nodes in the hierarchical structure.

14. The enterprise network of claim 12, wherein a second rule in the dial plan specifies a second pattern in the plurality of patterns based on a second rule set in the enterprise network.

15. The enterprise network of claim 13, wherein the first pattern is executed prior to execution of the second pattern.

16. A non-transitory computer-readable medium comprising processor-executable instructions, the instruction comprising:
    instructions configured to maintain a dial plan for an enterprise network, the dial plan having a hierarchical structure where nodes in the dial plan comprise members which meet a common set of dial plan rules, wherein the hierarchical structure of nodes in the dial plan comprises a hierarchy of location levels;
    instructions configured to enforce the dial plan during call routing to normalize numbers dialed by users of the enterprise network, wherein normalizing the numbers dialed by the users is based on progressing from a node in the dial plan at a location level of a caller toward a root node; and
    instructions to use the normalized numbers to complete calls.

17. The computer-readable medium of claim 16, further comprising:
    instructions configured to assign a plurality of patterns for call flow in an enterprise canonical format;
    instructions configured to link the hierarchical structure of nodes based on the plurality of patterns; and instructions configured to display, based on the dial plan, a plurality of linked tables representing the dial plan.

18. The computer-readable medium of claim 17, wherein the dialed numbers are normalized by the dial plan irrespective of a location from which the user dials the number.

19. The computer-readable medium of claim 18, wherein a rule in the dial plan specifies a first pattern in a plurality of patterns based on a first rule set in the enterprise network.

20. The computer-readable medium of claim 19, wherein a second rule in the dial plan specifies a second pattern in the plurality of patterns based on a second rule set in the enterprise network.

* * * * *